United States Patent [19]

Meis

[11] Patent Number: 4,890,896
[45] Date of Patent: Jan. 2, 1990

[54] CONNECTING DEVICE FOR OPTICAL FIBERS

[75] Inventor: Michael A. Meis, Maplewood, Minn.

[73] Assignee: Minnesota Mining and Manufacturing Company, Saint Paul, Minn.

[21] Appl. No.: 198,872

[22] Filed: May 26, 1988

[51] Int. Cl.[4] .............................................. G02B 6/38
[52] U.S. Cl. ............................... 350/96.21; 350/96.20
[58] Field of Search ............... 350/96.20, 96.21, 96.22, 350/96.15, 96.17; 250/227, 552; 357/17, 19, 30, 74, 80

[56] References Cited

U.S. PATENT DOCUMENTS

| 4,470,180 | 9/1984 | Blomgren | 206/306 X |
| 4,768,855 | 9/1988 | Nishi et al. | 350/96.21 X |
| 4,778,243 | 10/1988 | Finzel | 350/96.21 |

FOREIGN PATENT DOCUMENTS 2104693 10/1982 France ............................. 350/96.20

*Primary Examiner*—John D. Lee
*Assistant Examiner*—Phan T. Heartney

*Attorney, Agent, or Firm*—Donald M. Sell; Walter N. Kirn; Stephen W. Buckingham

[57] ABSTRACT

A known optical fiber connector includes an elongated mount which is encompassed by a housing that releasably pinches a free end of an optical fiber against a groove in the surface of the mount, thus connecting that free end either coaxially to a free end of another optical fiber or to an opto-electronic element. That connection is made more secure by a block on which the mount can be precisely lodged. The block is formed with a channel extending substantially parallel to the mount and a slide that is slidable in the channel between advanced and retracted positions. When advanced, a protrusion on the slide causes the housing to be deformed, thus enabling a free end of an optical fiber to be positioned in the groove of the mount. When the slide is retracted, the housing returns to its undeformed state and pinches the optical fiber against the groove. Upon movement of the slide to its retracted position, the protrusion causes a post to grip an intermediate portion of the optical fiber, thus securing the fiber against accidental movement. By forming the clock with a series of channels and slides, a number of pairs of optical fibers can be interconnected coaxially.

19 Claims, 3 Drawing Sheets

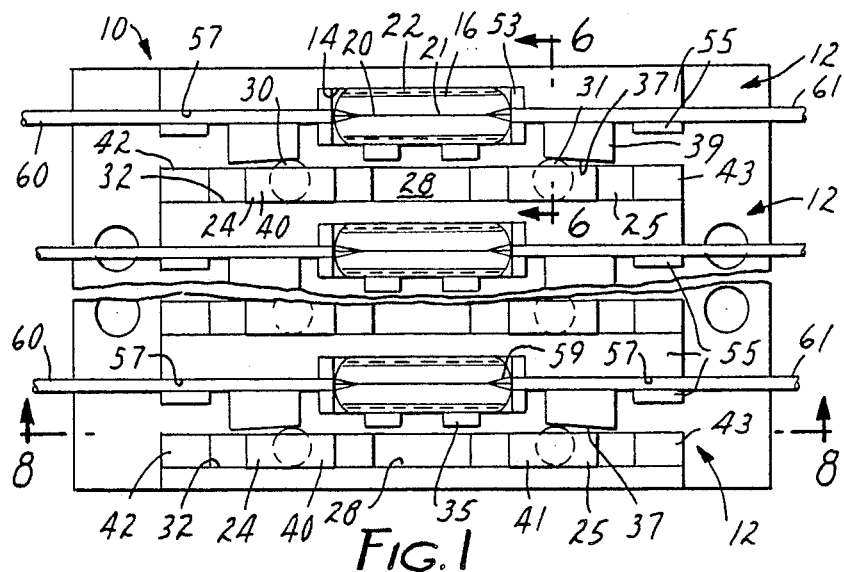
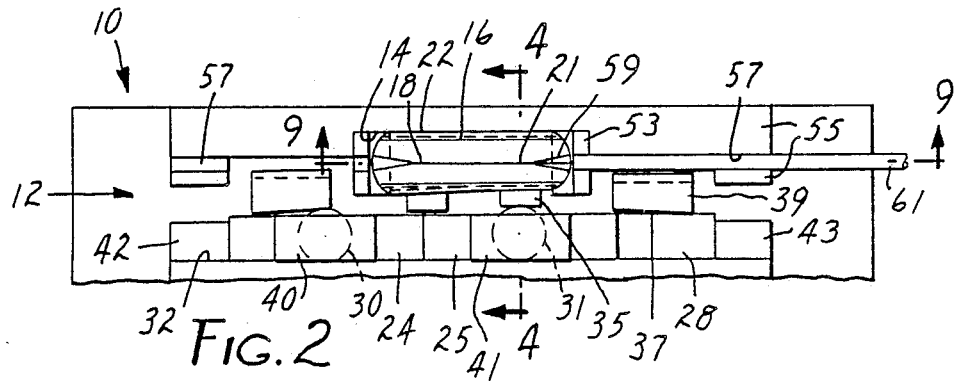
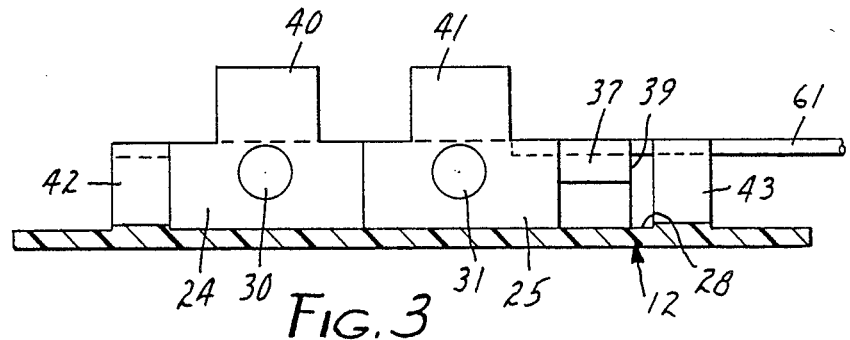

CONNECTING DEVICE FOR OPTICAL FIBERS

BACKGROUND OF THE INVENTION

1. Field of the Invention

The invention concerns optical fiber connectors such as can coaxially interconnect free ends of two optical fibers or can connect an optical fiber to an opto-electronic element. The invention is particularly concerned with multiple optical connectors.

2. Description of the Related Art

Prior optical fiber connectors tend to be expensive, often requiring mechanical elements to be secured permanently to the free ends of the optical fibers, followed by attaching each such element either to a complementary element or to a fixture. Doing so can require special tools. See, for example, Thomas & Betts Corp. Cat. No. 93800SK.

A relatively inexpensive optical fiber connector can be constructed as disclosed in U.S. Pat. No. 4,470,180 (Blomgren). A preferred Blomgren connector includes an elongated mount that is encompassed by a resiliently deformable housing which, in its relatively undeformed state, can pinch an optical fiber against a groove in the surface of the mount. When compressed, the housing is deformed to permit an optical fiber to be positioned on the mount or to be withdrawn. When the compression is released with a free end of an optical fiber positioned on the mount, the housing returns to its undeformed state to grip the free end as shown in FIG. 6B of the Blomgren patent. In the same way, a second optical fiber can be coaxially interconnected with the first in abutting relation as shown in Blomgren FIG. 6C.

A mechanical splice now on the market ("Dorran/3M" mechanical splice) which employs the Blomgren Optical fiber connector has a strain-relief chock that grips a protective covering or buffer of each connected optical fiber to ensure against accidental loosening.

SUMMARY OF THE INVENTION

The invention provides an optical fiber connector which, like that of the Blomgren patent, is inexpensive, easy to use and does not require any auxiliary tool. The novel optical connector can be inexpensively constructed to form coaxial connections between a large number of pairs of optical fibers while virtually assuring that they will not become loosened accidentally.

Like the optical fiber connector of the Blomgren patent, that of the invention includes a mount and means for releasably holding a free end of an optical fiber against the mount, thus connecting the free end of that optical fiber either to a free end of another optical fiber or to an opto-electronic element. The optical fiber connector of the invention differs from that of the Blomgren patent by having a block on which the mount can be precisely lodged,
a device carried by the block and movable between an advanced position adjacent a lodged mount and a retracted position, and
means (a) actuated by movement of said device to its advanced position for releasing said holding means and (b) actuated by movement of said device to its retracted position for reactivating said holding means and for gripping an intermediate portion of the optical fiber when its free end is being held by said holding means In a preferred optical fiber connector of the invention:

the mount is elongated and has a longitudinal v-groove into which a free end of an optical fiber can be nested to position it with precision;

the holding means is a deformable housing that envelopes the mount and normally is substantially cylindrical and pinches said free end of an optical fiber against the v-groove and, when deformed to become elliptical, permits optical fibers to be inserted into and removed from the groove;

the block is formed with a channel adjacent and extending substantially parallel to the elongated direction of the mount;

the movable device is a slide that is positioned within the channel and is slidable in the channel between said advanced and retracted positions;

there are means for deforming the housing including a lug projecting from the block between the channel and the housing and a protrusion from the slide that presses the lug against the housing to deform the housing when the slide is in its advanced position; and said means for gripping an intermediate portion of the optical fiber includes a post projecting from the block adjacent said channel, and said protrusion presses the post against said intermediate portion when the slide is in its retracted position.

Typically, the buffer of an optical fiber is covered by a jacket. Preferably at the aforementioned intermediate portion of the optical fiber, the jacket has been removed, but the buffer is in place and has been stripped from the free end of the optical fiber only where it is to be positioned with precision in the groove of the mount.

The slide preferably is formed so that it can be moved with one's finger between its advanced and retracted positions, thus making it unnecessary to employ a separate tool for connecting or disconnecting optical fibers.

To enable the novel optical fiber connector to connect two optical fibers coaxially, its housing should either be split or sufficiently resilient so that when one end of the housing is deformed to release one of a pair of interconnected optical fibers, the other end of the housing can continue to pinch the other of the pair. The block of such a connector should include two movable devices as described, each acting on one of the abutting optical fibers.

Preferably the housing 22 is sufficiently transparent to permit one to see that the end of an optical fiber extends approximately to the center of the mount when the other half of the connector is empty. When one of the optical fibers is in position, it acts as a stop for the coaxial optical fiber.

DETAILED DISCLOSURE

Both the compressing of the housing and the gripping of an intermediate portion of an optical fiber can be accomplished by a single protrusion from the aforementioned slide. That protrusion can be a ball bearing held by a pocket of the slide. Instead of using a slide, the block can carry a lever that is centrally pivoted so that at the end of the lever can either compress the housing or can grip an intermediate portion of the optical fiber when the housing is not being compressed. This intermediate gripping (in combination with the pinching by the housing) ensures that the free end of the optical fiber is securely held in position, thus providing a reliable connection until the slide or lever is operated to release the optical fiber.

When the novel optical fiber connector is used to interconnect two optical fibers coaxially, the connector can incorporate means for slightly detuning the splice to attenuate transmitted signals. For example, the longitudinal groove in the mount can have a central discontinuity to position the abutting optical fibers to be slightly out of perfect coaxial alignment, thus slightly attenuating light transmitted through the connector. Doing so is desirable whenever there is a danger that the light signals being transmitted might be so intense as to cause a detector to go into saturation. When the transmitted light emanates from a semiconductor laser whose output gradually diminishes, the mount can be quickly and inexpensively changed from time to time to reduce the attenuation, thus keeping the transmitted signal levels substantially constant.

THE DRAWING

The invention may be more easily understood in reference to the drawing, all figures of which are schematic. In the drawing:

FIG. 1 is a plan view of a block holding an array of optical fiber connectors of the invention;

FIG. 2 is an enlarged plan view of one of the optical fiber connectors of FIG. 1, one slide of which has been moved to its advanced position;

FIG. 3 is a side elevation of the optical fiber connector of FIG. 2 with its slide in the same position;

Figure 4:
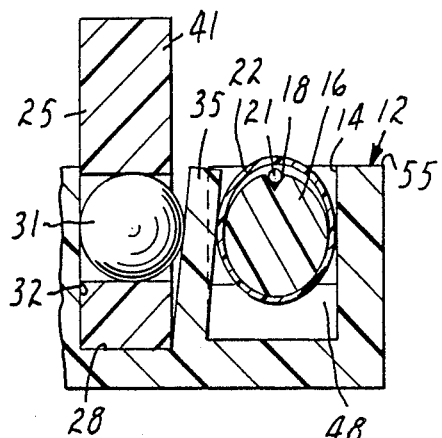
FIG. 4 is an enlarged cross section along line 4—4 of FIG. 2.

In FIG. 1, a block 10 holds an array of optical fiber connectors 12, four of which are shown wholly or in part, each of identical construction. For each of the optical fiber connectors, the block 10 has a cavity 14 in which a mount 16 of elliptical cross section is lodged to position with precision a longitudinal v-groove 18 in the mount at one end of its major axis. Free ends of a pair of optical fibers 20 and 21 are nested in each of the V-grooves in abutting coaxial relation. Around each mount 16 is a deformable housing 22 which, when substantially not deformed, is cylindrical and pinches both optical fibers 20 and 21 against the longitudinal v-groove 18.

Each of the connectors 12 has a pair of elongated slides 24 and 25, each of which is slidable in an elongated channel 28 formed in the block 10. Each of the slides 24 and 25 is shown in its retracted position in FIG. 1, and a slide 25 is in its advanced position in FIG. 2.

Figure 5:
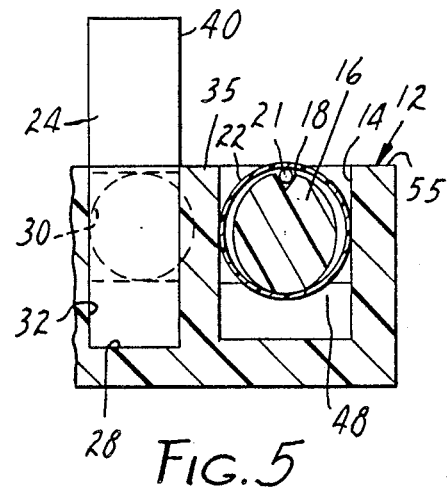
FIG. 5 is a cross section as in FIG. 4 except with the slide in the retracted position.

Each of the slides 24 and 25 has a pocket containing a ball 30 and 31, respectively, that protrudes from one side of the slide to ride against a wall 32 of the channel 28. When a slide 25 is in its advanced position as shown in FIG. 2, its ball 31 presses an upstanding lug 35 against the housing 22, deforming that portion of the housing as shown in FIG. 4, thus lifting the housing to free the optical fiber 21 to permit it either to be inserted into or removed from the v-groove 18 of the mount 16. When the slide 25 is retracted to its position in FIG. 1, the housing 22 is released to assume its normally substantially cylindrical shape and thus pinch the optical fiber 21 against the v-groove of the mount 16 as shown in FIG. 5 Such retraction causes one corner of the slide 25 and its ball 31 to press against a slanted surface 37 of a post 39. The post in turn is pressed against an intermediate portion of the optical fiber 21, thus locking the optical fiber securely in place until the slide is again moved to its advanced position.

Figure 7:
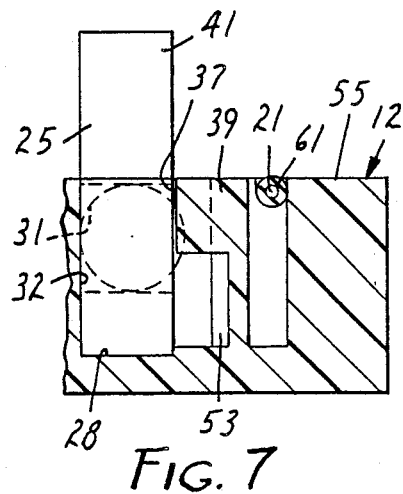
FIG. 7 is a cross section as in FIG. 6 except with the slide in the advanced position.
Figure 6:
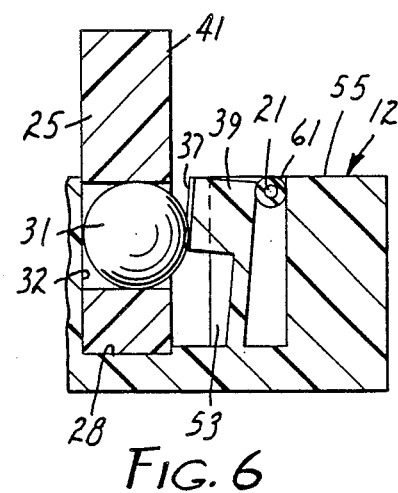
FIG. 6 is an enlarged cross section along line 6—6 of FIG. 1.

The action of the posts 39 is as illustrated in FIGS. 6 and 7, with the slide 25 in its retracted and advanced positions, respectively.

As seen in FIG. 3, each of slides 24 and 25 has an upstanding projection 40 and 41, respectively, to permit a user to slide them along the channel 28 with the fingertip. Hence, no tool is required to connect optical fibers into the illustrated optical fiber connectors. Movement of the slides is limited by the ends 42 and 43 of each of the channels 28, and each slide acts as a stop for the other, thus permitting only one of the two connected optical fibers to be manipulated at one time.

Figure 8:
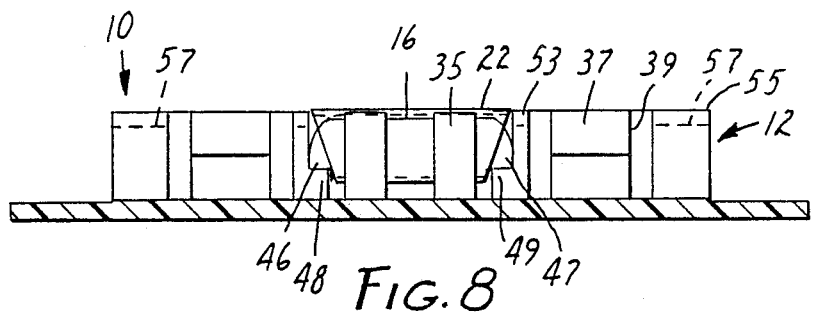
FIG. 8 is an enlarged cross section along line 8—8 of FIG. 1.
Figure 9:
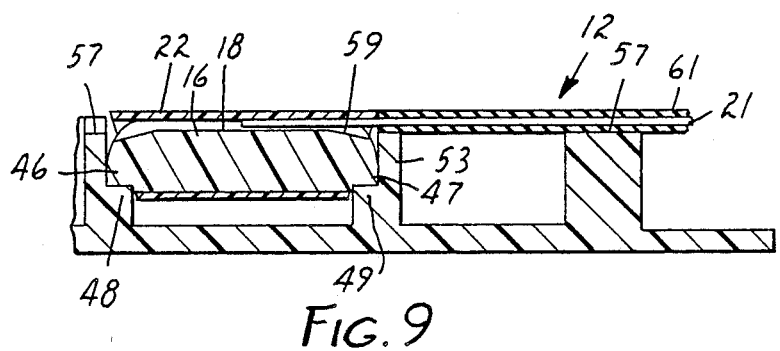
FIG. 9 is an enlarged cross section along line 9—9 of FIG. 2.

The manner in which each of the mounts 16 is lodged in the block 10 is shown in FIGS. 8 and 9. As seen in FIG. 8, the ends of each housing 22 are cut away to permit a shoulder 46 and 47 at each end of the mount 16 to rest on a seat 48 and 49, respectively, formed in the block 10.

A wall 53 at an end of each cavity 14 and the top surface 55 of the block 10 of each connector are formed with furrows for guiding an optical fiber into each of the optical fiber connectors 12, and each mount 16 at an end of its groove 18 has a bell mouth 59 as seen in FIGS. 2 and 9 to enhance threading optical fibers into the v-groove 18.

Each of the optical fibers 20 and 21 has a buffer 60 and 61, respectively, that is stripped away from that portion of the optical fiber that extends into the V-groove 18 while protecting the portion of the optical fiber that is contacted by one of the posts 39.

Any of the mounts 16 of the illustrated optical fiber connectors can easily be replaced by a mount having a stepped groove so that connected pairs of optical fibers are slightly out of perfect coaxial alignment, thus passing attenuated signals for reasons discussed above.

Figure 10:
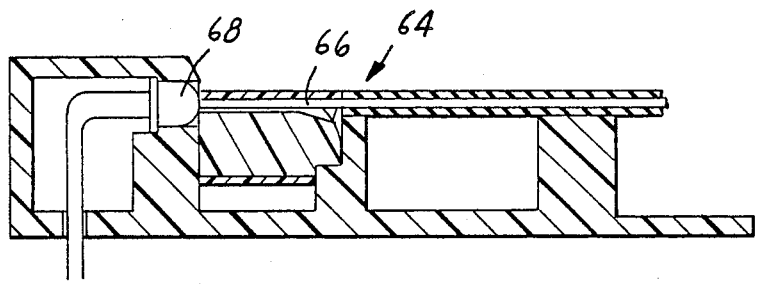
FIG. 10 is a cross section similar to that of FIG. 9 showing an optical connector of the invention that connects an optical fiber to an opto-electronic element.

As seen in FIG. 10, an optical fiber connector 64, which is identical in construction to half of one of the optical fiber connectors 12, permits an optical fiber to be connected to an opto-electronic element 68.

EXAMPLE 1

A prototype of the block 10 illustrated in FIGS. 1–9 has been constructed to have six optical fiber connectors for six pairs of glass optical fibers, each having a diameter of 125 $\mu$m without the buffer Both the block and the slides 24 and 25 were machined from acetal resin, even though they would in production be more economically molded of a high impact, low creep, engineering plastic such as polyetherimide resin (e.g., "Ultem" from G.E.). The housings 22 were cut from extruded polysulfone tubing which has good transparency. A useful material for the housings which is not transparent is beryllium copper. The balls 30 and 31 were standard steel ball bearings. Key dimensions of the prototype were:

| | |
|---|---|
| Angle of v-grooves 18 | 70° |
| Depth of v-grooves | 15 mm |
| Length of housings 22 | 12.7 mm |
| Diameter of housings | 3.9 mm |
| Width of channels 28 | 2.9 mm |
| Width of slides 24 and 25 | 2.8 mm |
| Length of slides | 12.3 mm |
| Diameter of balls 30 and 31 | 3.2 mm |
| Height of lugs 35 | 5.4 mm |
| Height of posts 39 | 5.4 mm |
| Taper of surfaces 37 | 7° |

In order to connect plastic-clad plastic optical fibers that have much greater diameters than the optical fibers used with the prototype, the elements of the device would be proportionately larger.

I claim:

1. An optical fiber connector including a mount and means for releasably holding a free end of an optical fiber against the mount wherein said holding means comprises a deformable housing which encompasses the mount and, when substantially undeformed, can pinch a free end of an optical fiber against the mount or, when deformed, can release the free end, wherein the improvement comprises
   a block on which the mount can be precisely lodged,
   a device carried by the block and movable between an advanced position adjacent a lodged mount and a retracted position, and
   means actuated by movement of said device to its advanced position for releasing said holding means and actuated by movement of said device to its retracted position for reactivating said holding means and for gripping an intermediate portion of the optical fiber, a free end of which is being held by said holding means.

2. An optical fiber connector as defined in claim 1 and including a second means for releasably holding against the mount a free end of a second optical fiber in coaxial abutting relation with the first, said optical fiber connector further comprising
   a second device carried by the block and movable between an advanced position adjacent the mount and a retracted position, and
   means actuated by movement of said second device to its advanced position for releasing said second holding means and actuated by movement of said second device to its retracted position for gripping an intermediate portion of the second optical fiber, a free end of which is being held by said second holding means.

3. An optical fiber connector as defined in claim 1 wherein the block contains an opto-electronic element, and said holding means includes means for releasably holding a free end of an optical fiber in abutting relation with the opto-electronic element.

4. An optical fiber connector as defined in claim 1 wherein the surface of the mount has a groove.

5. An optical fiber connector as defined in claim 4 wherein the block is formed with a channel extending parallel to the groove and said movable device comprises a slide that is slidable in said channel between said advanced and retracted positions.

6. An optical fiber connector as defined in claim 4 and including a second means for releasably pinching against the groove a free end of a second optical fiber, said groove being stepped so that connected pairs of optical fibers are slightly out of perfect coaxial alignment, thus passing attenuated signals.

7. An optical fiber connector as defined in claim 5 wherein the slide includes a protrusion which deforms the housing when the slide is in its advanced position.

8. An optical fiber connector as defined in claim 7 wherein said protrusion comprises a ball bearing in a pocket of said slide.

9. An optical fiber connector as defined in claim 4 wherein said movable device comprises a lever that is movable between said advanced and retracted positions.

10. An optical fiber connector including a mount having a groove and encompassed by a substantially cylindrical, resiliently deformable housing that, when substantially undeformed, can pinch the free end of an optical fiber against the groove or, when deformed, can release the free end, wherein the improvement comprises
    a block formed with a channel extending substantially parallel to the groove,
    a slide positioned within said channel and movable between an advanced position adjacent said housing and a retracted position,
    means actuated by movement of the slide to its advanced position for deforming said housing, and
    means actuated by movement of the slide to its retracted position for gripping an intermediate portion of an optical fiber, the free end of which is being pinched by the housing.

11. An optical fiber connector as defined in claim 10 wherein the slide includes means for moving it with ones finger between the advanced and retracted positions.

12. An optical fiber connector as defined in claim 10 wherein the mount and housing include means for independently pinching free ends of two optical fibers against the groove in abutting coaxial relation, said optical fiber connector further comprising
    a second slide positioned within said channel and movable between an advanced position adjacent the housing and a retracted position,
    means actuated by movement of the second slide to its advanced position for deforming the housing adjacent the free end of a second optical fiber, and
    means actuated by movement of the second slide to its retracted position for gripping an intermediate portion of said second optical fiber.

13. An optical fiber connector as defined in claim 10 wherein said means for deforming the housing further comprises a lug projecting from the block between said housing and said channel and also comprises means protruding from the slide for pressing said lug against said housing when the slide is in its advanced position.

14. An optical fiber connector as defined in claim 13 wherein said means protruding from the slide comprises a ball bearing held by a pocket of the slide.

15. An optical fiber connector as defined in claim 14 wherein the face of the post that is contacted by the ball bearing is tapered.

16. An optical fiber connector as defined in claim 10 wherein said means for gripping an intermediate portion of an optical fiber further comprises a post projecting from the block adjacent said channel and also comprises means protruding from the slide for pressing said post against an intermediate portion of an optical fiber, the free end of which is being pinched by the housing.

17. An optical fiber connector as defined in claim 12 wherein said block is formed with a plurality of said housings and an equal number of said channels, and a first and second slide is movably positioned within each channel.

18. An optical fiber connector as defined in claim 17 wherein each housing is sufficiently resilient so that when one end of the housing is deformed to release one of a pair of interconnected optical fibers, the other end of the housing can continue to pinch the other of the pair, there are two slides in each channel, and said block includes means actuated by movement of each slide for deforming the adjacent end of the housing and for gripping an intermediate portion of an optical fiber, the free end of which is being pinched by one of the sections of the housing.

19. A block containing a plurality of optical fiber connectors, each of which includes an elongated mount, wherein:

each mount is elongated and has a longitudinal v-groove into which a free end of an optical fiber can be nested to position it with precision;

a deformable housing envelops the mount and normally is substantially cylindrical and pinches a free end of an optical fiber against the v-groove and, when deformed to become elliptical, permits an optical fiber to be inserted into and removed from the groove;

the block is formed with a channel adjacent to and extending substantially parallel to the elongated direction of each mount;

a slide is positioned within each channel and is slidable in the channel between advanced and retracted positions;

a lug projects from the block between each channel and the adjacent housing;

a post projects from the block adjacent said channel at a position remote from said housing; and each slide has a protrusion which, when the slide is in its advanced position, presses said lug to deform the housing and thus permit an optical fiber to be inserted or released and, when the slide is in its retracted position, presses said post against an intermediate portion of the optical fiber when its free end is being pinched by the housing.

* * * * *